United States Patent Office 2,729,671
Patented Jan. 3, 1956

2,729,671

METHOD OF INHIBITING POLYMERIZATION AND PRODUCT

William G. Bickford and Charles H. Mack, New Orleans, La., and Richard N. Moore, Lake City, Fla., assignors to the United States of America as represented by the Secretary of Agriculture No Drawing. Application April 22, 1952,
Serial No. 283,746

2 Claims. (Cl. 260—486)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to the use of certain stabilizers for improving the stability of a material normally subject to oxidative changes, including retarding the polymerization via the ethylenic linkage of vinyl-type monomers, and retarding oxidative changes in facts and oils and the like, which changes cause deterioration and development of rancidity. Use of stabilizers with the vinyl-type monomers is preferred.

In general according to this invention a minor amount of the stabilizer is incorporated with the material to be stabilized, the particular stabilizer used being norconidendrin, alpha-conidendrol and beta-conidendrol.

The oil and fats and the like, which may be stabilized include glyceridic oils that develop oxidative rancidity, e. g., the oils in fats such as lard, beef, tallow, butter, ice cream and the like, marine oils such as shark liver oil, halibut liver oil, cod liver oil and the like, hydrogenated oils, foods and feeds that contain carotene or vitamin A and undergo oxidative deterioration, unsaturated materials that tend to undergo oxidative polymerization, e. g., linseed oil, tung oil, pyrethrins, terpenes, polycyclopentadiene and the like, and resins and polymers that tend to undergo oxidative degradation, e. g., pine gum, rubber, synthetic rubbers such as the GR–S rubbers, butadiene polymers and the like.

The concentration of this stabilizer to be used with the materials listed above can vary from about 0.001 to 1 percent by weight. In general, a concentration of from about 0.01 to 0.1 percent is preferred. In each particular case the most suitable concentration will depend upon the degree of stability desired and the particular kind of materials which are being stabilized.

The vinyl-type monomers which may be stabilized in accordance with the invention include vinyl acetate, allyl propionate, methyl acrylate, methyl methacrylate, vinyl chloride, mixtures of vinyl chloride with vinyl acetate, styrene, mixtures of styrene with butadiene, and the like.

The concentration of the stabilizer to be used with the vinyl-type monomers can vary from about 0.001 to 5 percent by weight based upon the weight of the vinyl monomers. In general a concentration of from about 0.01 to 0.1 percent by weight is particularly suitable. In each particular case, the most suitable concentration will depend upon the degree of stability desired and upon the type of monomers stabilized.

Table I exhibits the effects of the stabilizers when they are incorporated in lard.

Table I

| Antioxidant | Concentration, Percent | Lard [1] |
|---|---|---|
| Control | 0.00 | 4 |
| Alpha conidendrol | 0.01 | 32 |
| Do | 0.10 | 88 |
| Beta conidendrol | 0.01 | 40 |
| Do | 0.10 | 107 |
| Norconidendrin | 0.01 | 27 |
| Do | 0.10 | 141 |

[1] Keeping time expressed as the number of hours required for the sample to reach a peroxide value of 40 milliequivalents per kg. of fat.

Table II exhibits the effects in retarding polymerization of the stabilizers when incorporated into certain of the vinyl-type monomers. For comparison, the properties in which the polymerization inhibitor is hydroquinone are also included in the table.

Table II

| Inhibitor | Concentration, percent | Styrene [a] | Methyl methacrylate [b] | Vinyl acetate [c] |
|---|---|---|---|---|
| Alpha conidendrol | 0.01 | 104 | 14 | 13 |
| Do | 0.10 | 162 | 17 | 103 |
| Beta conidendrol | 0.01 | 86 | 25 | 13½ |
| Do | 0.10 | 92 | 26 | 33 |
| Hydroquinone | 0.01 | 121 | 27 | 15 |
| Do | 0.10 | 213 | 72 | 72 |
| Norconidendrin | 0.01 | 187 | 20 | 10 |
| Do | 0.01 | 95 | | |
| Do | 0.10 | 123 | 14 | 75 |
| Do | 0.10 | 130 | | |

[a] Expressed as the time in hours required at 65° C. to attain a viscosity of 100 poises at room temperature.[d]
[b] Samples were maintained at 65° C. for 150 hours, then placed under ultraviolet irradiation at room temperature. The keeping time is expressed as the number of hours under ultraviolet required for the samples to attain a viscosity of 100 poises at room temperature.[d]
[c] Expressed as the number of hours required under ultraviolet irradiation for the samples to attain a viscosity of 100 poises at room temperature.[d]
[d] All viscosities were measured by means of a Gardner bubble viscometer.

It is evident from the data presented in Table II that the conidendrols possess marked antipolymerization properties for vinyl type monomers. Although they are not as effective as hydroquinone, which is one of the best inhibiters, they are non-volatile and their use renders it possible to distil the monomer, rather than resorting to alkali washing, to remove the stabilizer. Alpha conidendrol is more effective than the beta isomer in preventing polymerization, whereas the beta form is more effective in stabilizing fats and oils against oxidative rancidification.

Table III summarizes the results obtained when beta conidendrol was compared as an antioxidant, at four concentrations, for preventing viscosity changes in GR–S polymer with phenyl beta naphthylamine (PBNA), which is known to afford good protection to this type polymer. GR–S latex was prepared at 122° F. to 73.1% conversion and 54 ML–4 viscosity. Each compound was added to the latex in the form of a slurry which was prepared as follows: The antioxidant was dissolved in 50 ml. of acetone containing 0.4 gram of a dispersing agent using the sodium salts of polymerized alkyd aryl and aryl alkyd sulfuric acids presently marketed under the name Daxad-11 and the resulting solution mixed well with one quart (0.946 l.) of water. The suspension was added to the latex followed by the coagulation of the mixture with salt and acid. The raw polymers containing respectively, 0.375, 0.813, 1.25, and 1.50 parts of antioxidant per 100 parts of rubber were heated in air at a temperature of 100° C. for 2, 4, 8, 24, and 48 hours. Samples were removed at each interval and examined for viscosity changes, the appearance of oxidized surface coatings, and for the formation of graininess on remilling.

PBNA produced a deep brown stain on an exposed lacquered surface of the raw polymer while antioxidant A and antioxidant B produced a slight but definite staining. Only a negligible amount of staining was observed in the polymer containing beta conidendrol. Of the four antioxidants evaluated in the stabilization of GR–S polymers beta coidendrol appears to be superior in every respect.

*Table III*

| Inhibitor | Concentration, p. h. r.[a] | Viscosity[b] | | | | | |
|---|---|---|---|---|---|---|---|
| | | 0 Hours | 2 Hours | 4 Hours | 8 Hours | 24 Hours | 48 Hours |
| β-Conidendrol | 0.375 | 54 | 46 | 36 | 29 | 50 | 60 |
| Do | 0.813 | 55 | 56 | 56 | 57 | 55 | 52 |
| Do | 1.25 | 58 | 57 | 57 | 56 | 54 | 50 |
| Do | 1.50 | 57 | 58 | 57 | 58 | 57 | 56 |
| PBNA | 0.375 | 57 | 57 | 57 | 54 | 48 | 33 |
| Do | 0.813 | 55 | 54 | 54 | 47 | 28 | 26 |
| Do | 1.25 | 53 | 52 | 51 | 49 | 36 | 25 |
| Do | 1.50 | 54 | 52 | 50 | 46 | 30 | 23 |

[a] Parts of inhibitor per 100 parts of rubber.
[b] Expressed as ML–4 units.

The effectiveness of both alpha and beta conidendrol in protecting fat-containing candies against rancidification was compared with that of butylated hydroxyanisole and di-tert-butyl-p-cresol. A butter cream fondant containing 5% fat was employed in a series of four tests in which (a) the antioxidant was incorporated into the candy at a concentration of 0.10% based on the fat content; (b) 10 parts per million of copper stearate was added based on the weight of the butter; (c) both copper stearate and antioxidant were employed; and (d) a control without inhibitor or accelerator. The candies were stored in an air oven at 86° F. and samples were removed at intervals for examination. The fat was extracted and its peroxide content determined in the usual manner.

At the end of 21 weeks the peroxide content of the control was 15 me./kg. of fat, that of the sample containing only copper stearate was 24, while those samples which contained antioxidants with and without copper stearate had a peroxide value of zero. All of the antioxidants tested were equally effective in preventing rancidification of the fat in the candy; but had no significant effect in retarding the development of free fatty acids.

The acceptability of the conidendrols as stabilizers for food products will depend on the results of toxicological studies which are still in progress. After nine months of feeding tests no adverse effects have been noted on the health, growth, and activity of rats receiving a diet containing up to 1% of the conidendrols.

Having thus described our invention, we claim:

1. A vinyl-type monomer normally subject to polymerization via the ethylenic linkages containing as a polymerization retarder a minor amount of a compound selected from the group consisting of norconidendrin, alpha-conidendrol and beta-conidendrol.

2. The monomer according to claim 1 wherein the amount of polymerization inhibitor is about from 0.001 to 5% by weight based upon the weight of monomer.

References Cited in the file of this patent

Fisher et al.: Journal of the American Oil Chemists Society, Oct. 24, 1947, pp. 340–343.

Swartling CA44/2664b (1950).

D'Alelio: Fundamental Principles of Polymerization, Wiley (1952), page 327.